United States Patent [19]

Gelardi et al.

[11] Patent Number: 5,308,015

[45] Date of Patent: May 3, 1994

[54] DUST DOOR ARRANGEMENT FOR VIDEO CASSETTES

[75] Inventors: Paul J. Gelardi; John A. Gelardi, both of Kennebunkport; David A. Capotosto, Kennebunk, all of Me.

[73] Assignee: LCV Associates, Kennebunkport, Me.

[21] Appl. No.: 886,152

[22] Filed: May 21, 1992

[51] Int. Cl.$^5$ .......................................... G11B 23/087
[52] U.S. Cl. .................................................... 242/199
[58] Field of Search ............... 242/197, 198, 199, 200; 360/132

[56] References Cited

U.S. PATENT DOCUMENTS

| | | | |
|---|---|---|---|
| 4,449,677 | 5/1984 | Ohta et al. | 242/199 |
| 4,475,700 | 10/1984 | MacLeod et al. | 242/197 |
| 4,591,936 | 5/1986 | Kikuya et al. | 360/132 |
| 4,670,809 | 6/1987 | Teuber | 360/132 |
| 4,844,377 | 7/1989 | Shiomi et al. | 242/198 |
| 4,893,766 | 1/1990 | Yamashina et al. | 242/198 |
| 4,969,612 | 11/1990 | Thomas | 242/199 |
| 4,984,122 | 1/1991 | Sato | 360/132 |
| 5,084,799 | 1/1992 | Moo Yeol et al. | 360/132 |
| 5,092,536 | 3/1992 | Gelardi et al. | 360/132 X |
| 5,114,092 | 5/1992 | Gelardi et al. | 360/132 X |

FOREIGN PATENT DOCUMENTS 8700321 10/1988 Australia .

*Primary Examiner*—Daniel P. Stodola
*Assistant Examiner*—John P. Darling
*Attorney, Agent, or Firm*—James Creighton Wray

[57] ABSTRACT

A dust door arrangement which avoids spring clip malfunction and enhances video cassette longevity. Reduced width of cavities containing first and second side hinges between the dust door and the video cassette cover improve hinge flexibility and operation and eliminate hold down spring clips catching when the video cassette is being withdrawn from a VCR. The dust door, hinge and cover are integrally molded, with the hinge lying below the surface of the cover of the video cassette and providing an axis of rotation for the door with respect to the cover. The hinge and cavity are approximately of the same width and are about two to four times as wide as the thickness of the dust door side walls. A supplemental spring is preferably provided to bias the dust door downward. The dust door first and second thin side walls have bevelled tops with extended steps which form first and second hinges. Flat tops of the hinges oppositely mate with first and second extensions extending down from the cover. The bevelled tops have angles of less than 30% to reduce angle of incidence. The width of the hinge is greater than the width of the thin side walls, but no greater than four times the width of the side walls. The width of the downward extensions approximate the width of the hinges. At least one of the side walls of the dust door has a tape leader viewing access for providing visual access to the tape leader without raising the dust door.

13 Claims, 3 Drawing Sheets

DUST DOOR ARRANGEMENT FOR VIDEO CASSETTES

BACKGROUND OF THE INVENTION

The present invention relates to integrally molded video cassettes. Specifically, the present invention addresses dust doors integrally hinged to video cassette covers.

The molding of dust doors on video cassettes with living hinges is a recent advent in the art of video cassette manufacture. The impetus behind providing a dust door in integral relation with a video cassette is primarily reduction of labor, reduction of parts, accuracy and simplicity of manufacture associated therewith, recyclability of the substantially uniform cassettes, and further improvements in the art of molding. Through continued testing of this technology, it has been shown that further improvements in conjunction with the hinges improve performance of the video cassettes and the dust doors when moving into opened position in a player and into closed position when removed from a video cassette recorder.

Several important goals exist as with previous devices. One relates to the ability of an integrally molded hinge to maintain strength well beyond the life of the video cassette. Previous hinges were relatively wide to maintain elasticity and resist breakage. However, it has been found that the width previously thought necessary to maintain hinge strength may cause jamming of the cassette within a small number of machines because of a hold down spring clip, platen or roller moving into depressions by the hinges. When the cassettes are inserted into video cassette recorders, tops of cassettes are held downward while the dust doors are moved upward to expose the video tape. Upon removal of the cassettes, spring clips or rollers in the machines slide across the top surfaces of the covers of the cassettes and over the dust doors. It is typical for dust covers to have short side portions which are hinged to the cassette side walls in indentations or cavities along the sides of the cassette. The indentations approximate the thickness of the door side portions. If those indentations are made too wide, as was previously thought necessary to accommodate wide hinges, the hold down spring clips can slip into the wide recesses and can jam a cassette or machine or prevent raising of the doors.

The hinges are attached to sides of the dust doors. The angles of the hinged extensions are important for proper functioning of the spring clip. A severe angle can cause jamming. The present invention addresses the potential problems of jamming due to wide hinges and severe angles in dust door hinge arrangements.

Another problem solved by the invention relates to the detection of tapes which have not been rewound. With prior cassettes, the user or rental employee had to lift the dust door to see if the clear leader was present, thus indicating a fully wound tape, or otherwise look through a clear window inserted in the cassette's cover.

The present invention also provides solutions to previous problems related to supplemental spring arrangements for dust door biasing.

SUMMARY OF THE INVENTION

The present invention is a dust door arrangement for video cassettes. The dust door and video cassette cover are preferably integrally molded and joined by plural living hinges. At least one of the hinges preferably cooperates with a supplemental spring attached to the cassette and to the door proximally to the hinge to bias the door closed with respect to the cassette.

The spring incorporates a door attachment end and a cassette attachment end for fitting within door and cassette spring receptors respectively. The spring moves longitudinally in guides as it torques and restores while the dust door is opened and closed.

A dust door side wall notch or window or a transparent door side provides access for clear leader viewing or light sensing without opening the door. Sides of the dust doors are relieved, notched or bevelled so that clear tape leader signalling lights may be viewed through openings in the indented portions of the cassette sides while the dust door is closed.

The dust door has a front face for covering exposed video tapes when in the closed position, and first and second opposite side walls extending perpendicularly from the front face toward first and second side hinges. The side walls have rear edges. The hinges are molded to the rear edges and oppositely to first and second downward extensions of the cover. The rear edges of the dust door preferably have bevelled tops. The hinges are molded oppositely to downward edges of the downward extensions and the bevelled rear edges. That positions the hinges below a plane as provided by a top surface of the cover and the top of the dust door, forming an axis of rotation of the dust door with respect to the cover below that plane.

Preferably the indentations of the cassette side walls for receiving the hinge are less than or equal to four times the thickness of the side walls. That permits hinge widths of about two to four times the wall thickness, which has been found to provide substantial hinge life and strength.

The hinges preferably have flattened extended upper surfaces and notched lower surfaces, with the axes of rotation at the notches. The extended flat upper surfaces improve hinge operations. A coil of the supplemental spring is provided adjacent the lower surface of the notch. A first leg is attached to the dust door and a second leg slides in and out of the cassette. A preferred spring is a spring having a central coil and offset opposite dust door attachment and cassette attachment ends. The coil is positioned below or adjacent the notched lower surface of the hinge. That biases the dust door at its axis of rotation.

A coil retaining means is preferably provided adjacent the coil for holding the coil in close relation to the notched lower hinge surface.

The retaining means may be an abutment molded perpendicularly downward from the cover. The coil is positioned between an exterior face of the downward abutment and an interior face of the door side wall with a width of the coil approximating a width between the interior face of the side wall and the exterior face of the abutment. That restricts lateral movement of the spring.

The dust door spring end attachment means is generally near the top of the interior face of the side wall, substantially above the placement of the coil with the coil tensed near the axis for biasing the dust door downward in the closed position.

Since the spring coil is positioned beneath the notch, the coil moves as the dust door is raised and lowered. The outer end of the spring is fixed in the dust door. The inner leg of the spring moves in and out through an opening in a front facing portion of the side wall at the edge of an indentation in the side wall.

The integrally molded cassette and door are preferably made of a polypropylene material.

In an alternate preferred embodiment, the dust door side wall incorporates a clear leader viewing means. Some cassettes incorporate windows on the side of the shell through which the tape can be seen. In others, the tape is exposed across the front and partially along the side walls. The present side walls of the dust door incorporate window or leader access means to view the tape without raising the dust door. A notched rear edge, an aperture, or an opaque or clear side wall are preferred access means. Those can be provided on integrally molded video cassettes, or on traditional cassettes with doors molded separately and attached during cassette assembly. The access means is a new embodiment, and an improvement over the prior art.

A preferred dust door arrangement for video cassettes has a dust door integrally molded to a video cassette cover for rotation on the cover at first and second side hinges. The dust door has a front, a top and first and second opposite side walls. The dust door is made of uniform thickness. The side walls substantially overlap first and second sides of the video cassette with the dust door front covering a front face of the video cassette when the dust door is in a closed position. At least one of the rear edges of the side walls has a bevelled top portion angling from the top of the dust door downward toward a molded attachment inward extension which also extends rearward, with a flat upper surface and a lower notch forming a hinge therebetween. The hinge is less than or equal to four times the width of the thin side wall for maximizing strength and prolonging use while providing a smooth hinge, and is oppositely molded to a downward extension extending downward from a side edge portion of the cover. The sloped downward extension can have a width ranging from the same width as the side wall to four times the width of the side wall. The width of the downward extension can approximate the width of the hinge, yet is minimized for prevention of spring clip jamming. The sloped extension ends in the flat forward extension with the notch below a flat upper surface which forms the hinge. A supplemental spring may be provided proximal the hinge for biasing the dust door to the closed position. The spring has a dust door attachment end and a cassette attachment.

The spring is preferably a coil spring having a central coil positioned proximal the hinge. The spring has a dust door attachment end fixedly attached to the dust door and a cassette attachment end slidably attached to the video cassette.

In a preferred embodiment, the width of the downward extension and hinge are approximately the same, and the width of the thin side wall is approximately one half of the width of the hinge.

A molded connection between the thin side wall and wider hinge describes a step a given distance from an axis of rotation for the hinge. The downward extension and bevelled edge mate at the hinge, providing the axis of rotation a given distance on the side wall from the side edge of the cover. The distance between the axis of rotation and the side edge of the cover is preferably greater than the distance between the axis of rotation and the step so that the step does not protrude above the cover upon rotation of the dust door. That minimizes incidence of spring clip catch.

In one embodiment, the thin side wall is approximately 1 mm thick and the hinge is about 3 mm wide. The notch or indentation in the side wall is about 3.5 mm, leaving a 0.5 mm clearance.

The angle of the bevelled edge with respect to the top of the door is preferably less than or equal to 30%, reducing spring clip incident angle to prevent spring clip catching in the dust door side notch.

The present video cassette is produced at a substantial savings in materials and elements, number of parts and labor, with improved quality. The cassette is totally unique.

The preferred cassette weighs 1.5 oz to 1.8 oz less than a standard cassette, resulting in postage savings for direct mail applications.

In a preferred embodiment, the cassette eliminates windows to allow for a full wrap around face and spine label. That innovative look may eliminate the need for the box board sleeve in several applications.

Preferably the cassette is available in a range of colors, and the use of polypropylene versus the standard polystyrene gives the cassette a unique feel and lubricity, reducing dropouts and improving the product.

A preferred video cassette has a reel flange positive engagement braking system, an integral pressure flap, dust door and tape guides. The cassette is totally recyclable. The present cassette easily surpasses 100 and more plays with no increase in dropouts. Independent testing has shown the cassette to perform on par with the dropout performance of a premium A shell and to have far fewer dropouts than a standard B shell.

Testing on the present dust door has shown it to be capable of cycling more than 10,000 times. The engineering of the cassette has resulted in the elimination of more than 25 parts, the consequence of which is product consistency and reliability. The fully automated manufacturing demonstrates superior consistency versus a standard cassette, which has 30 hand assembled parts.

Preferably the cassette is source reduced and manufactured from compatible plastic materials. The cassette can be completely recycled, tape and label included, with minimal disassembly of the product. The producer of the cassette, is establishing a recycling operation to convert the material into next generation products. The present cassette can be produced of recycled material with no sacrifice in product quality. It is the only video cassette in the world which has responsibly addressed the environmental issue in a proactive fashion.

In a preferred embodiment, the cassette holds 65 minutes of tape (SP) and 195 minutes (EP) and performs excellently with all grades of top coated tape. Back coated tape is not recommended since it tends to drag in fast forward and rewind.

These and further and other objects and features of the invention are apparent in the disclosure, which includes the above and ongoing written specification, with the claims and the drawings.

DETAILED DESCRIPTION OF THE DRAWINGS

Figure 1:
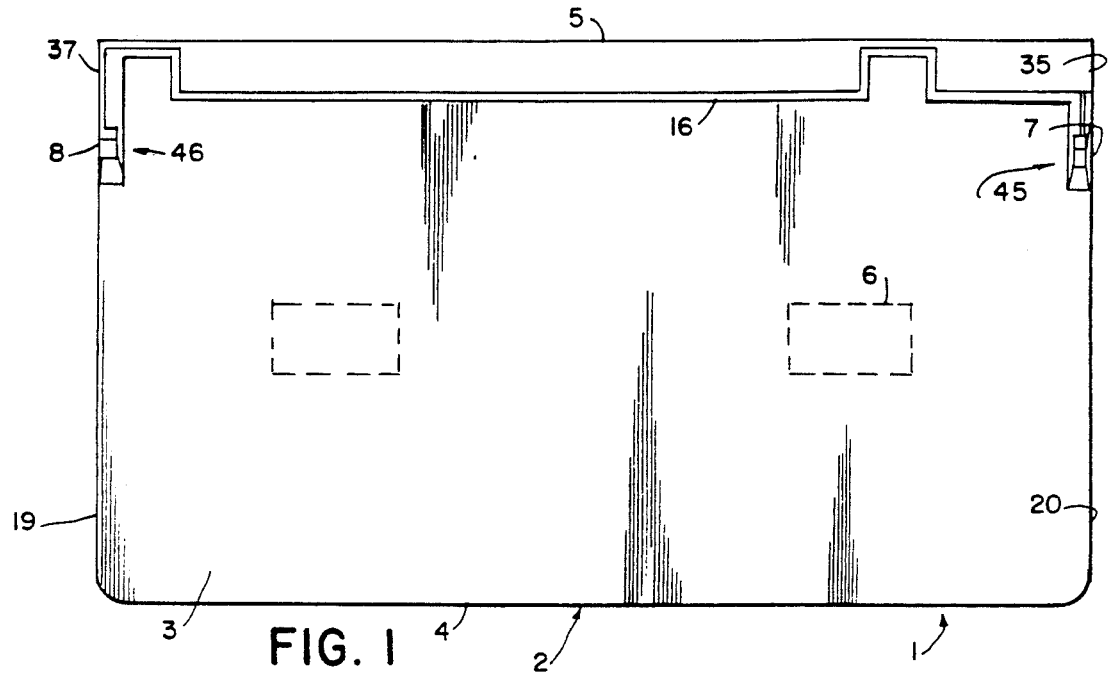
FIG. 1 shows a preferred video cassette with the preferred narrow living hinges and supplementary spring.
Figure 2:
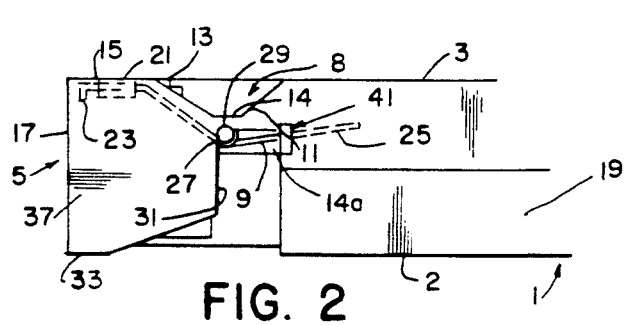
FIG. 2 is a side view of a preferred hinge and door arrangement with the door in the closed position.
Figure 3:
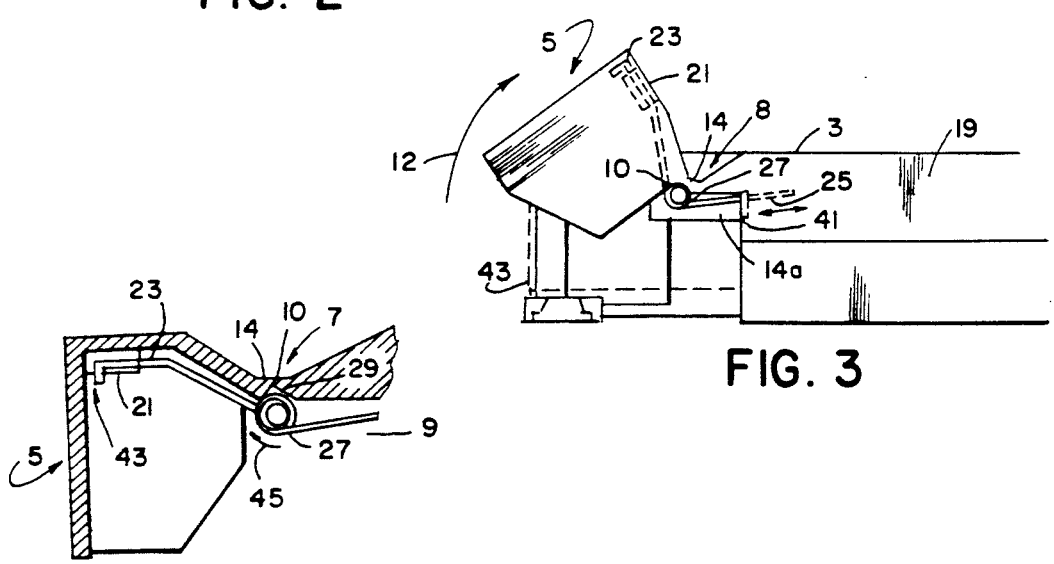
FIG. 3 is a side view showing the door raised.

As shown in FIGS. 1, 2 and 3, a video cassette, generally indicated by the numeral 1, incorporates a base, a rear wall 2, a cover 3 and a dust door generally indicated by the numeral 5. The dust door 5 is integrally molded with the cover 3 on first and second hinges 7 and 8. The hinges and adjoining structures are located in cavities 45 and 46 at the sides of the cover near a front 16 of the cassette. The dust door 5 moves as per arrow 12 in FIG. 3 on an axis of rotation 10 provided by the first and second hinges 7 and 8.

In the preferred video cassette as shown in FIG. 1, reel springs 6 are molded within the cover to press the reels downward. No windows are provided to view tape position. A label lies flat on the cover. The label may have a tear-off portion that surrounds the front, back and bottom of the cassette, eliminating a need for a shipping sleeve.

The hinges 7 and 8 are provided between the cover 3 and door 5 on first and second sides 20 and 19 near the front 16 of the video cassette 1.

The dust door 5 incorporates a front face 17, a top 15, approximately in the same plane as the top of the cover 3, and first and second sides 35 and 37 which may be approximately identical. The sides have rear edges 31, bevelled top edges 13 and bottom edges 33.

As shown in FIGS. 2 and 3, the sloped edge 13 angles downward from the top 15 of the dust door to a flat surface 14 which extends rearward toward the rear edge of the side wall recess to sloping surface 11. The flat portion 14 and the notched surface 14a form the hinge 8.

The hinge 8 incorporates a flat upper extension surface 14 and a lower surface 14a. The hinge 8 oppositely attaches to a downward extension 11 extending from the cover 3 downward along the side 19 of the cassette toward the front face 12. The lower surface 14a of the hinge 8 can preferably have a notch 29 or groove, as shown in FIG. 2. That groove establishes the axis of rotation 10 and further assists in nesting and fulcruming a supplemental spring 9 positioned adjacent or under the hinge.

The supplemental spring 9 assists the hinge in biasing the dust door downward, and generally prolongs the life and improves the operation of the video cassette. A preferred spring 9 is a coil spring having a central coil 27, a dust door attachment end 23, and an opposite cassette attachment end 25. The opposite ends are laterally offset as is typical for coil springs. The coil 27 is a cylindrical structure which is preferably mounted either coaxially with the axis of rotation, or with its outer circumference abutting part of the notch which forms the axis of rotation.

In a preferred embodiment, the door attachment end 23 of spring 9 is fixedly attached to the door by a dust door end receptor 21 provided on the door 5. The receptor 21 can be sited on the dust door interior near the top 15, creating torsion on the central coil 27 which is positioned near the axis of rotation 10 and biasing the dust door downward in the closed position. The cassette attachment end 25 of spring 9 is preferably mounted within a cassette attachment end receptor 41, shown by the dashed line in FIG. 2. The receptor can be an aperture provided in the shell of the cassette into which the end 25 is inserted and is free to slide along its length. That sliding motion as shown in FIG. 3 is imparted by raising the dust door, as shown by arrow 12.

As the cassette is inserted into a video cassette recorder, the dust door is raised by a mechanism to expose a tape 43 running across the face of a video cassette. The fixed attachment between the receptor 21 and the door end 23 pulls the central coil 27 forward and around the axis of rotation 10. Sliding the coil along wall 28 which is extended downward from the cover. The sliding attachment between the cassette spring end receptor 41 and the cassette attachment spring end 25 allows that movement, thereby maintaining approximately even torsion of the spring on the door as the door travels from closed to open positions and vice versa. Maintaining a relatively constant spring pressure on the dust door regardless of its position is important to the present invention, it permits smooth operation of the door. Variable tension might lead to damage of the cassette and VCR, and might further promote jamming.

The flat upper surface 14 extends the axis of rotation 10 forward on the video cassette. It has been found that forward placement greatly reduces potential spring clip catching incidence. Further, the surface 14 provides a larger hinge area, which increases wear life of the hinge.

Figure 4:
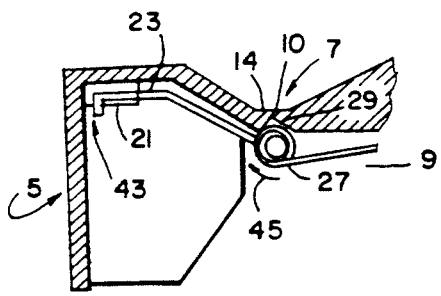
FIG. 4 is a cutaway side view showing the hinge, door and supplementary spring.

FIG. 4 shows an interior view of the hinge 7, having a flat upper surface 14, a notched lower surface 29 prescribing the axis of rotation 10. A supplemental spring 9 is shown by hinge 7, although it is desirable to use only one spring by one hinge. The coil 27 of the spring 9 abuts the forward portion of the notch near the axis of rotation 10 for revolving thereabout as indicated by arrow 45 when the dust door 5 is lifted. The fixed attachment between the receptor 21 and the dust door spring end 23 pulls the coil 27 around the axis 10 when the dust door is lifted, and maintains approximately constant downward pressure on the door due to the changing of the position of the coil around the axis 10.

Figure 5:
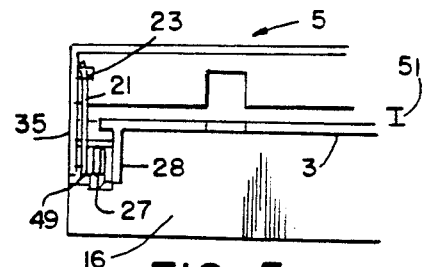
FIG. 5 is a front view of the open door and spring.

FIG. 5 is a frontal view of the video cassette showing the door 5 in the open position. The door 5 preferably provides some clearance 51 when lifted to expose the front 16. The cover 3 preferably has a downwardly extending abutment wall 28 adjacent the coil 27 to hold the coil in alignment when the spring slides during door operation. The cassette may also incorporate a cassette spring end track or abutment for aligning and holding the cassette spring end during sliding. Opposite the abutment 28, the spring dust door side 35 has an interior wall 49 which abuts the opposite side of the cylindrical coil 27, maintaining alignment of the coil around the axis of rotation during operation of the door.

Figure 6:
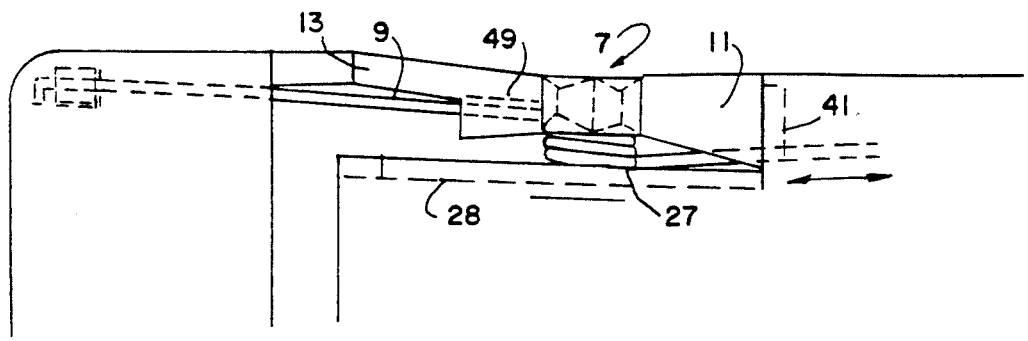
FIG. 6 is a top view of the cover, hinge, door and spring arrangement.

FIG. 6 shows the hinge 7 and spring 9 from a top view. The coil is placed between the abutment 28 and the wall 49. The cassette end receptor 41 is shown as an aperture in the cassette shell or housing, and can be supplemented or replaced with a track or cassette end guide.

Figure 7:
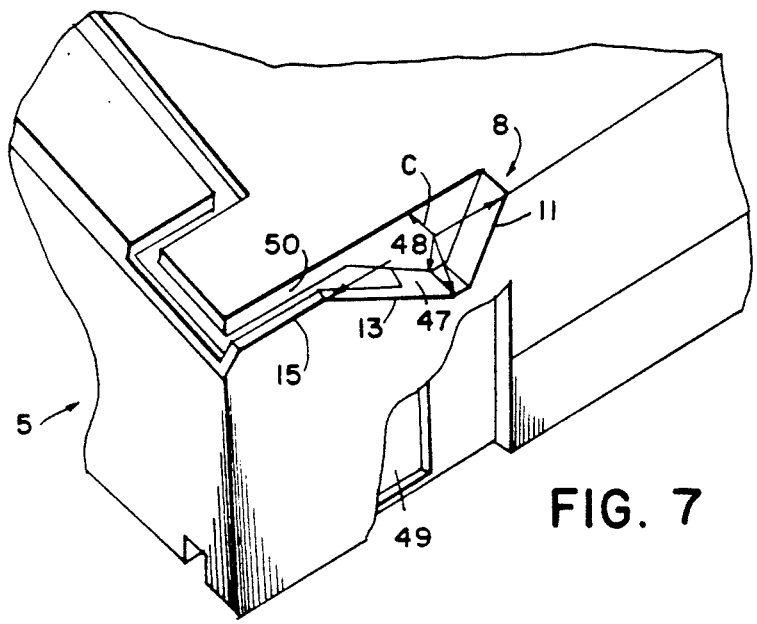
FIG. 7 is a perspective of a first side hinge.
Figure 8:
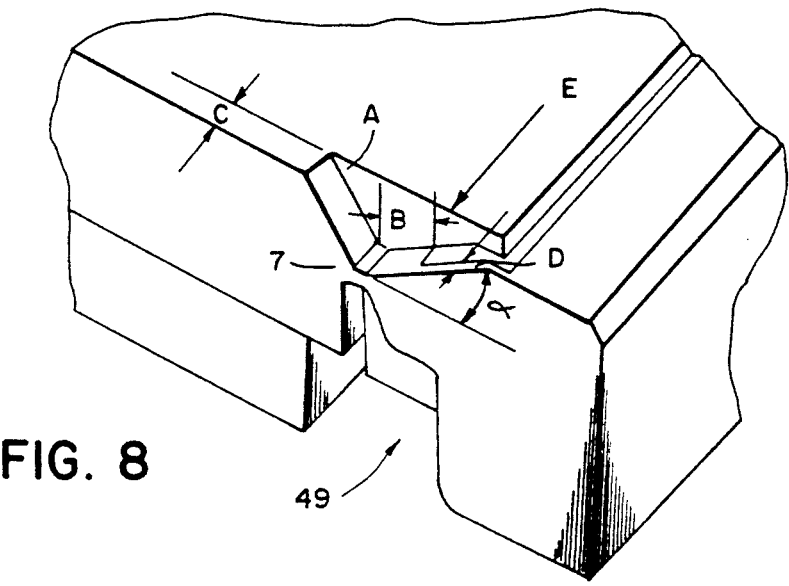
FIG. 8 is a perspective of the opposite side hinge.

FIGS. 6, 7 and 8 show the dimensions of the dust door side wall 15, the downward extension 11, the bevelled rear edge 13, a step 47 formed on the bevelled edge 13 of the door side wall for widening the hinge 8 to between two and three times the wall thickness. A cavity 48 is formed above the hinge, downward extension and bevelled edge 13 near the forward extension 50 of the cover. Also shown in FIGS. 7 and 8 is an access notch 49 provided in the dust door side 15 for allowing access to view a clear leader when the dust door is in the closed position. The notch in the dust door side wall is provided for optical access detection of a clear leader on a reel tape end by eye or light when the door is closed.

In FIG. 8, cavity width C is shown to approximate the width of the hinge 7. The hinge width is shown to be approximately twice the width of the side wall 15. FIGS. 7 and 8 show hinge structures for opposite hinges 7 and 8. The structure of each is preferably approximately the same, although supplemental springs can be provided under one or both hinges. The narrowed width C of the cavity 48 is important. Previous inventions had widths of 0.250 inches or greater. It has been found that at those widths, certain types of cassette hold down devices in a small number of video cassette recorders are prone to catching. An object of the present invention is to have a cavity width of less than 0.250 inches. A preferred cavity width C is 0.140 inches, approximately twice the width D of the bevelled edge 13 and side wall 15 of 0.070 inches. The strength and longevity of the hinges are adequate after narrowing. Smoothness of operation and accommodation of slight hinges axis misalignments, if any, may be improved by narrowing the hinges.

It is not necessary for the cavity width C to be the same as the hinge width. However, it is preferable that the hinge width be no greater than four times the thickness D of the door side wall.

The differing widths between the hinge and the bevelled edge of the side wall are accommodated by a step 47, a given distance B from the flat surface of the hinge, which is near the axis of rotation of the dust door. It is preferable for that step distance B to be less than a distance A defined between the top of the flat surface, or the axis of rotation, and the top of the cover. Because B is less than A, revolution of the step 47 upwards due to rotation of the dust door does not cause the step to protrude above the top surface of the cover. That step is functional in avoiding any hold-down interference during cover lifting.

Through repeated testing of prior art, it has been found that the angle of the bevelled edge 13 is also important to eliminate hold-down or spring clip catching. It has been found that angles above 30 result in a greater than normal incidence. The present invention provides an angle $\alpha$ of less than or equal to 30°, thus eliminating that problem.

One object of the present invention is to provide a maximum width E across the front top surface of the cover proximal the front 16, thereby reducing incidence of spring clip catching.

Because of the large numbers and variation of video cassette recorders, including the variety of placement of spring clips, a primary object of the present invention is to reduce the profile of the hinges needed for function of the dust door.

The present preferred hinges have widths of two times, three times or four times the thickness of the sides of the dust door. Width C of the cavity is reduced from the applicant's prior devices; the angle of incidence between the spring clip and the dust door, which is the angle provided by the bevelled edge, is reduced; and portions of the door and hinge protruding above the top surface of the cover due to rotation of the door are eliminated.

In most VCRs, spring clips or rollers typically are provided to press down on the cover of the cassette to bias the cassette downward, to provide flexible top guidance, and to assist in reclosing the dust door upon removal from the machine. It is a principal object of the invention to provide low profile narrow hinges that will not interfere with the action of the hold down spring clips.

Figure 9:
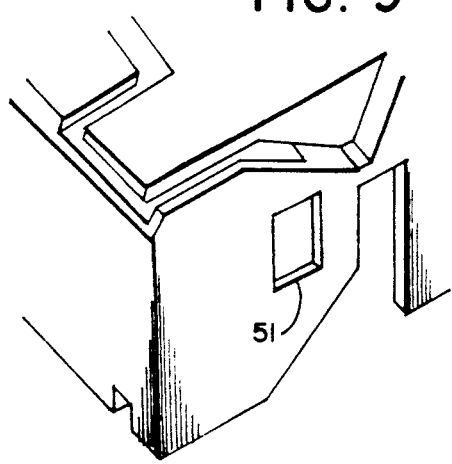
FIGS. 9 and 10 are perspective views showing alternative window access means, apertures in the dust door side wall and opaque or clear side wall respectively.
Figure 10:
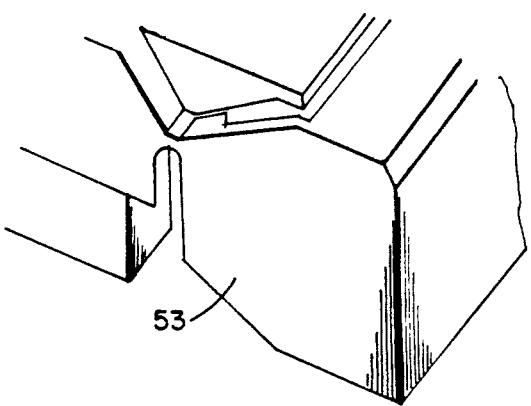

As shown in FIG. 7, a tape leader window access 49 can be a notch in the lower back edge of the side of the dust door. Alternatively, as shown in FIG. 9, the window access means can be an aperture 51, or in FIG. 10 the dust door side can be an opaque or clear wall 53. The window access means 49 provides a more versatile video cassette. The end of a tape in a cassette is typically clear; therefore, a user or video rental store employee can readily look through the window access means and see whether a tape has been rewound without raising the dust door.

Figure 11:
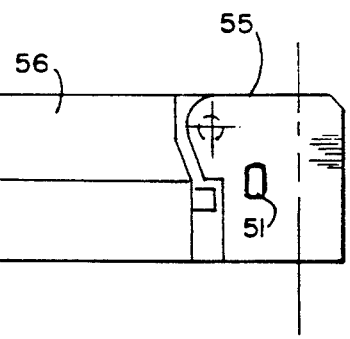
FIGS. 11-14 show window or leader access means provided on a dust door side wall.
Figure 12:
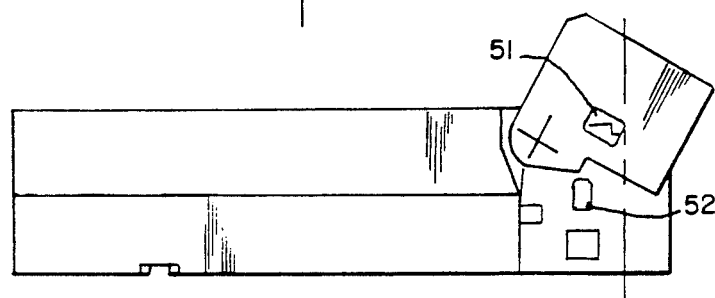
Figure 13:
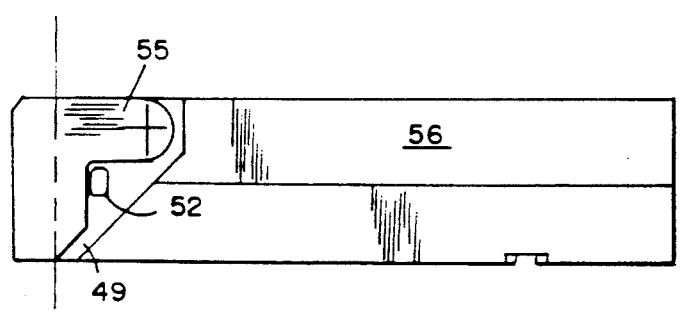
Figure 14:
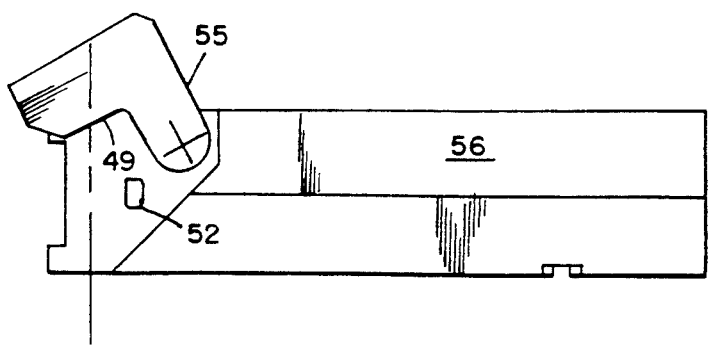

FIGS. 11–14 show an alternative form of a dust door 55 molded with the shell 56. The doors have window access means. In FIGS. 11 and 12 showing the door in the closed and opened positions, the door 55 has a solid side wall with an aperture 51 for access to the window 52 for viewing the tape without raising the lid. The aperture is aligned with the window in the closed position. FIGS. 13 and 14 show the window access means as a notch 49 for accessing the window 52 to view a clear leader of a tape. The advantages of tape leader optical access through a closed door are obtained by this invention, whether or not the dust door is integrally hinges to the cassette. The improvements have enhanced advantages in the integral hinge cassettes since tape reel viewing windows are avoided.

While the invention has been described with reference to specific embodiments, modifications and variations of the invention may be constructed without departing from the scope of the invention, which is defined in the following claims.

We claim:

1. Video cassette apparatus comprising an integrally molded dust door and video cassette cover being joined by plural, integrally molded living hinges, at least one of the hinges incorporating a supplemental spring attached proximally to bias the door with respect to the cover, the spring incorporating a door attachment and a cassette attachment end for fitting within door and cassette spring receptors respectively, the dust door having a front face for covering exposed video tapes when in the closed position, and first and second opposite side walls extending from the front face toward first and second side hinges, the dust door side walls having rear edges, the hinges molded to the rear edges and oppositely to first and second opposite sides of the cover, the cover having first and second downward extensions at the first and second sides, and the rear edges of the dust door having bevelled tops, wherein the hinge is molded oppositely to the downward extension and the bevelled rear edge, thus positioning the hinge below a plane as provided by a top surface of the cover and dust door and forming an axis of revolution of the dust door with respect to the cover below that plane, the hinge provided in a cavity between the downward extension and bevelled edge, wherein the hinge has a flattened upper surface and a notched lower surface, the axis of rotation of the dust door prescribed proximal the notch, and the spring provided adjacent the lower surface and attached oppositely to the dust door and cassette.

2. The apparatus of claim 1, further comprising the spring being a trap spring having a central coil and offset opposite dust door attachment and cassette attachment ends, a coil retaining means provided adjacent the coil for holding the coil in close relation to the axis of rotation.

3. The apparatus of claim 2, further comprising the retaining means being an abutment molded perpendicularly downward from the cover adjacent the downward extension.

4. The apparatus of claim 3, further comprising the spring positioned between an exterior face of the downward abutment and an interior face of the door side wall with a width of the coil approximating a width between the interior face of the side wall and the exterior face of the abutment, thus restricting lateral movement of the spring.

5. The apparatus of claim 1, further comprising the integrally molded apparatus made of a polypropylene material.

6. Video cassette apparatus comprising a dust door integrally molded to a video cassette cover for rotation on the cover at first and second side hinges, the dust door having a front, a top and first and second opposite side walls, the side walls overlapping first and second sides of the video cassette with the dust door front covering a front face of the video cassette when the dust door is in a closed position, at least one rear edge of the side walls having a bevelled top portion angling from the top of the dust door downward toward a molded attachment with the hinge, the hinge being less than four times wider than a thickness of the side wall for maximizing strength and prolonging use, and the hinge oppositely molded to a downward extension extending downward from a side edge of the cover, further comprising a supplemental spring provided proximal the hinge for biasing the dust door in the closed position, the spring having a dust door attachment end and a cassette attachment end, further comprising the spring being a trap spring having a central coil positioned proximal the hinge, a dust door attachment end fixedly attached to the dust door and a cassette attachment end slidably attached to the video cassette, further comprising a connection between the thin side wall and wider hinge providing a step a given distance from an axis of rotation for the hinge, the downward extension and bevelled edge mating at the hinge, providing the axis of rotation a given distance on the side wall from the side edge of the cover, the distance between the axis of rotation and the side edge of the cover being greater than the distance between the axis of rotation and the step so that the step does not protrude above the cover upon rotation of the dust door.

7. Video cassette apparatus having a dust door rotating on hinges provided between the dust door and the video cassette, the dust door comprising a front face for covering a tape in the video cassette and first and second opposite side walls, at least one of the side walls having an access means for viewing the video tape when the dust door is in a closed position.

8. The apparatus of claim 7, wherein the window access means is an aperture provided in the side wall.

9. The apparatus of claim 7, further comprising the access means being a notch provided in the side of the door.

10. The apparatus of claim 7, further comprising the access means being an opaque material.

11. The apparatus of claim 7, further comprising the access means being a clear material.

12. The apparatus of claim 7, further comprising the video cassette being an integrally molded structure having living hinges provided between the cover and the dust door, wherein the first and second dust door sides partially overlap first and second sides of the video cassette, wherein the tape extends out of a front of the video cassette and is covered by the front face and the first and second sides.

13. The apparatus of claim 12, further comprising the integral video cassette tape and door constructed of a polypropylene material.

* * * * *